United States Patent [19]
Hyodo

[11] Patent Number: 5,331,240
[45] Date of Patent: Jul. 19, 1994

[54] FIELD ASSEMBLY OF ELECTRIC MOTORS

[75] Inventor: Kohki Hyodo, Nishio, Japan

[73] Assignee: Makita Corporation, Anjo, Japan

[21] Appl. No.: 65,625

[22] Filed: May 21, 1993

[30] Foreign Application Priority Data

May 22, 1992 [JP] Japan .................. 4-041165

[51] Int. Cl.⁵ .................. H02K 11/00; H02K 3/46
[52] U.S. Cl. .................. 310/71; 310/42; 310/260
[58] Field of Search .................. 310/71, 180, 260, 42; 242/1.1

[56] References Cited

U.S. PATENT DOCUMENTS

| | | | |
|---|---|---|---|
| 3,725,707 | 4/1973 | Leimbach et al. | 310/71 |
| 3,979,615 | 9/1976 | Neff | 310/71 |
| 4,161,669 | 7/1979 | Aimar | 310/260 |
| 4,287,446 | 9/1981 | Lill et al. | 310/71 |
| 4,386,288 | 5/1983 | Laurie | 310/71 |
| 4,492,344 | 1/1985 | Baumann et al. | 310/71 |
| 4,569,125 | 2/1986 | Antl et al. | 310/71 |
| 4,602,178 | 7/1986 | Larsson | 310/71 |
| 4,926,075 | 5/1990 | Fushiya et al. | 310/71 |
| 4,982,124 | 1/1991 | Cummings et al. | 310/71 |
| 5,063,319 | 11/1991 | Mason et al. | 310/71 |
| 5,187,858 | 2/1993 | Murakoshi et al. | 310/71 |
| 5,229,674 | 7/1993 | Best | 310/71 |

FOREIGN PATENT DOCUMENTS

| | | | |
|---|---|---|---|
| 2065717 | 5/1975 | Fed. Rep. of Germany | 310/260 |
| 62-88435 | of 0000 | Japan . | |
| 2-214433 | of 0000 | Japan . | |

Primary Examiner—Emanuel T. Voeltz
Assistant Examiner—C. LaBalle
Attorney, Agent, or Firm—Lahive & Cockfield

[57] ABSTRACT

The present invention provides an improved field assembly of an electric motor which is free from broken wires or short circuits when being incorporated in a power-driven tool. The field assembly of the invention includes a metallic core formed of a stack of annular laminations around a cavity and having an upper end and a lower end, and a terminal plate composed of an insulating material and mounted on the upper end of the core. The terminal plate includes a plurality of first terminal supporting structures each disposed in the vicinity of a first or starting end of a coil winding for supporting and retaining an end of a coil wire extending from the coil winding; and a plurality of second terminal supporting structures each disposed in the vicinity of a second or terminal end of the coil winding for supporting and retaining an end of the coil wire. A first or starting end of the coil wire is wound outside the coil winding to be received by the second terminal supporting structures while a second or terminal end of the coil wire is wound outside the coil winding to be received by the first terminal supporting structures.

7 Claims, 4 Drawing Sheets

FIELD ASSEMBLY OF ELECTRIC MOTORS

BACKGROUND OF THE INVENTION

1. Field of the Invention

The present invention relates to a field assembly of an electric motor incorporated in power-driven tools, and more specifically to a coil terminating structure of a field assembly.

2. Description of the Related Art

In a conventional coil terminating structure, a coil winding 20 is wound on a field assembly 23, which includes a core 21 and a terminal plate 22 mounted on one end of the core 21 as shown in FIG. 4. A starting end 20a and a terminal end 20b of the coil winding 20 are respectively received by terminal structures, each including a terminal well 24 integrally formed on the terminal plate 22 and a terminal 25 inserted in the terminal well 24. The coil winding 20 is wound on the core 21 by a coil winding machine. Each end 20a or 20b of the coil winding 20 is held in each terminal well 24 under tension. When a commutator motor with such a field assembly is incorporated in power-driven tools such as electric hammers or drills causing vibration or shock, both ends of the coil winding are exposed to concentrated stress. Especially the starting end of the coil winding is pressed by the primary portion of the coil winding and has only a small degree of freedom, thus causing undesirable breaking or short circuit. In order to solve such problems, improved structures of a field assembly have been proposed, which includes a structure wherein a coil terminating portion of the terminal well is fixed by an adhesive (Japanese Patent Laying-Open Gazette No. 62-88435) and another structure which has a slack between the terminal well and the coil wire (Japanese Patent Laying-Open Gazette No. 2-214433).

However, the former structure prevents broken wires only at coil terminating portions and can not prevent the same on the boundary between the coil wire and the adhesive or a contact between the coil wire and another portion. The latter structure can not ensure a sufficient amount of slack and may cause broken wires when large vibration or shock is applied to.

SUMMARY OF THE INVENTION

The object of the invention is thus to provide an improved field assembly of an electric motor which is free from broken wires or short circuits when being incorporated in a power-driven tool.

The above and other related objects are realized by a field assembly of an electric motor including a metallic core formed of a stack of annular laminations around a cavity and having an upper end and a lower end, and a terminal plate composed of an insulating material and mounted on the upper end of the core, the terminal plate further including:

a plurality of wings for retaining a coil winding wound on the core away from the cavity of the core, the coil winding having a first or starting end and a second or terminal end;

a plurality of first terminal supporting structures each disposed in the vicinity of the first or starting end of the coil winding for supporting and retaining an end of a coil wire extending from the coil winding; and a plurality of second terminal supporting structures each disposed in the vicinity of the second or terminal end of the coil winding for supporting and retaining an end of the coil wire, wherein a first or starting end of the coil wire is wound outside the coil winding to be received by the second terminal supporting structures while a second or terminal end of the coil wire is wound outside the coil winding to be received by the first terminal supporting structures.

The terminal plate of the field assembly of the invention may further include a slit disposed outside the coil winding to hold the coil wire wound outside the coil winding.

The terminal plate may also include a plurality of partition wall structures each disposed between the first or second terminal supporting structures and the coil winding to face the cavity of the coil.

In the structure of the invention, the first or starting end of the coil wire is wound outside the coil winding to be received by the second terminal supporting structure while the second or terminal end of the coil wire is wound outside the coil winding to be received by the first terminal supporting structure.

The structure of the invention allows the first and second ends of the coil wire to be fixed to the terminal supporting structures at a desirable angle and with a relatively large degree of freedom, thus effectively preventing broken wires or short circuits of the field assembly in power-driven tools.

These and other objects, features, aspects, and advantages of the present invention will become more apparent from the following detailed description of the preferred embodiment with the accompanying drawings.

DESCRIPTION OF THE PREFERRED EMBODIMENT

Preferred embodiments of the invention are described hereinafter based on the drawings.

Figure 1:
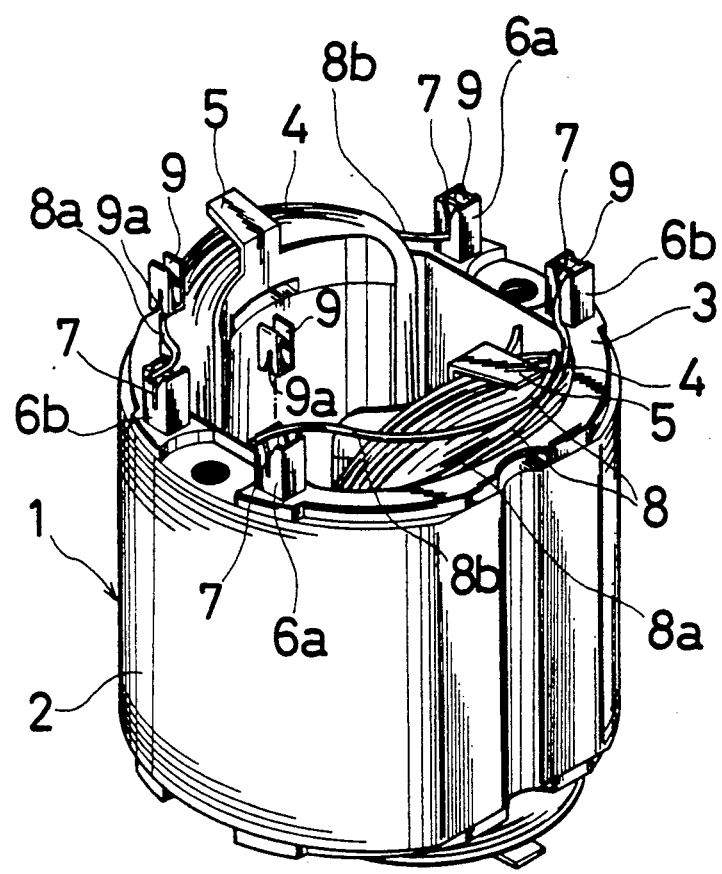
FIG. 1 is a perspective view showing a field assembly according to a first embodiment of the invention.

FIG. 1 is a perspective view showing a field assembly 1 according to a first embodiment of the invention. The field assembly 1 includes a metallic core 2 and a terminal plate 3 composed of an insulating material and mounted on an upper end face of the core 2. The terminal plate 3 includes a pair of wings 5, 5 for retaining coil windings 4, 4 away from a cavity of the core 2, a pair of box-like first terminal wells 6a, 6a formed in the vicinity of first or starting ends of the coil windings 4, 4 and a pair of box-like second terminal wells 6b, 6b formed in the vicinity of second or terminal ends of the coil windings 4, 4. Each terminal well 6a or 6b has a pair of 'Y' shaped slots 7,7 (hereinafter referred to as Y slot), one formed on an inner wall thereof facing the cavity of the core 2 and the other formed on an outer wall thereof. Both ends of a coil wire 8 extending from the coil winding are securely received and retained by the Y slots 7,7.

A first or starting end 8a of the coil wire 8 is wound outside the coil winding 4 to be received by the second terminal well 6b while a second or terminal end 8b of the coil wire 8 is wound outside the coil winding 4 to be received by the first terminal well 6a.

A generally 'U' shaped terminal 9 of a single piece of metal is pressed and inserted into each terminal well 6a,6a,6b,6b. Each terminal 9 has a slot 9a which is relatively wide in a base portion and relatively narrow in an upper portion to have an inverted 'Y' shape. These slots 9a,9a securely engage the first end 8a or the second end 8b of the coil wires 8,8, pierce enamel insulation on wire ends, and make an electrical contact between the terminals 9,9 and the first end 8a or second end 8b of the coil wires 8,8.

As described above, in the field assembly of the first embodiment, the first or starting end of the coil wire is held in the second terminal well formed in the vicinity of the second or terminal end of the coil winding whereas the second or terminal end of the coil wire is held in the first terminal well formed in the vicinity of the first or terminal end of the coil winding. This structure increases the degree of freedom between the coil winding and both ends of the coil wire held in the terminal wells, and allows the coil wire ends to be received in the terminal wells at desirable angles, thus increasing vibration or shock resistance and effectively preventing broken wires.

Although each coil terminal 6a or 6b has Y slots 7,7 facing the cavity of the core 2 in the first embodiment, these Y slots 7,7 may be formed across a circumferential wall of the core 2.

In the structure of the first embodiment, excessive freedom of the coil wire 8 may damage the coil winding 4 in vibration to cause short circuits.

Figure 2:
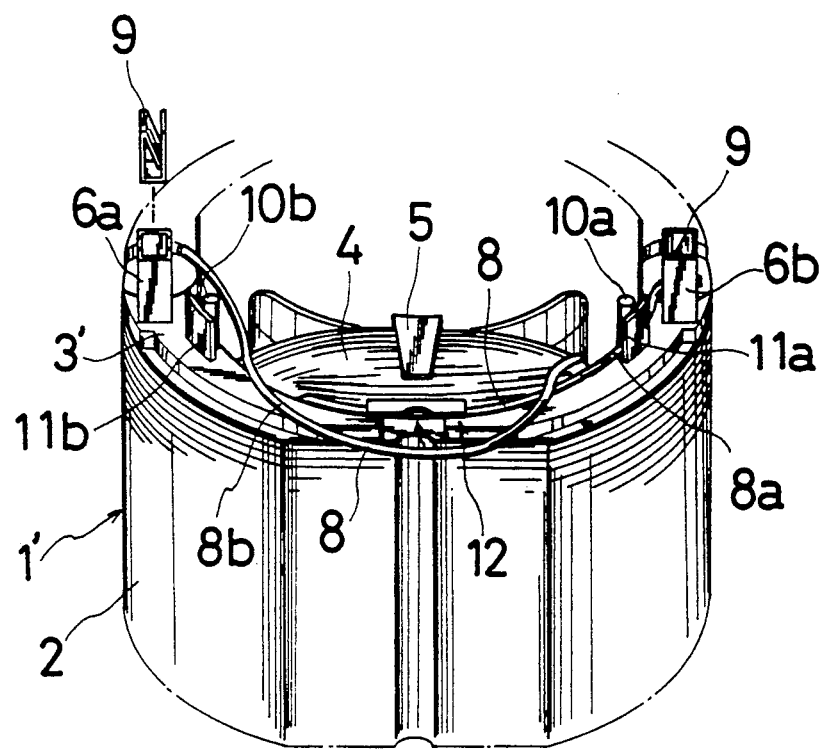
FIG. 2 is a partly omitted perspective view showing a field assembly according to a second embodiment of the invention.

FIG. 2 is a partly omitted perspective view showing a field assembly 1' according to a second embodiment of the invention. The field assembly of the second embodiment has a further improved structure which is free from potential short circuits. Like numerals denote like elements having structure identical with or similar to those in the first embodiment of FIG. 1.

In the field assembly 1' of the second embodiment, a terminal plate 3' includes four pairs of partition walls 10a,11a or 10b,11b formed along circumference of a core 2 and disposed between coil windings 4,4 and box-like first or second terminal wells 6a,6a or 6b,6b. Each pair of partition wall consists of a smaller guide wall 10a or 10b for keeping each end of a coil wire 8 free from a point contact with the coil winding 4 and thereby preventing short circuits, and a larger guide wall 11a or 11b for ensuring an insulating distance. The smaller guide wall 10a or 10b is arranged inside and apart from the larger guide wall 11a or 11b by a predetermined space corresponding to a diameter of the coil wire 8. The terminal plate 3' further includes a pair of slits 12,12 disposed outside the coil windings 4,4, each having a predetermined width corresponding to the space between the smaller guide wall 10a or 10b and the larger guide wall 11a or 11b.

In the field assembly 1' of the second embodiment, a first or starting end 8a of the coil wire 8 is held in the slit 12, goes through the predetermined space between the smaller guide wall 10a and the larger guide wall 11a, and retained by the second terminal well 6b whereas a second of terminal end 8b of the coil wire 8 is held in the slit 12, goes through the predetermined space between the smaller guide wall 10b and the larger guide wall 11b, and retained by the first terminal well 6a. This structure allows the coil wire 8 to be securely fixed to the terminal plate 3, thus preventing broken wires or undesirable vibration.

As described above, the partition walls 10a, 11a, 10b, 11b keep both the first and second ends of the coil wire 8 free from a point contact with the coil winding 4 in vibration, thereby effectively preventing broken wires and short circuits.

Although the second embodiment has the slits 12 for preventing contact between the coil wire 8 and the coil winding 4, the coil wire 8 may be wound in contact with and outside the coil winding 4 without the slit structure. The partition walls 10a, 11a, 10b, 11b and slits 12, 12 may have any desirable size and shape according to the requirements. The terminal plate 3' may include only either larger wall guides or smaller wall guides according to the requirements.

Although both the first and the second embodiments have box-like terminal wells with Y slots for receiving and retaining first or second ends of the coil wire, the principle of the invention may be applicable to terminal wells of another shape or a different terminating structure (for example, welding).

Figure 3:
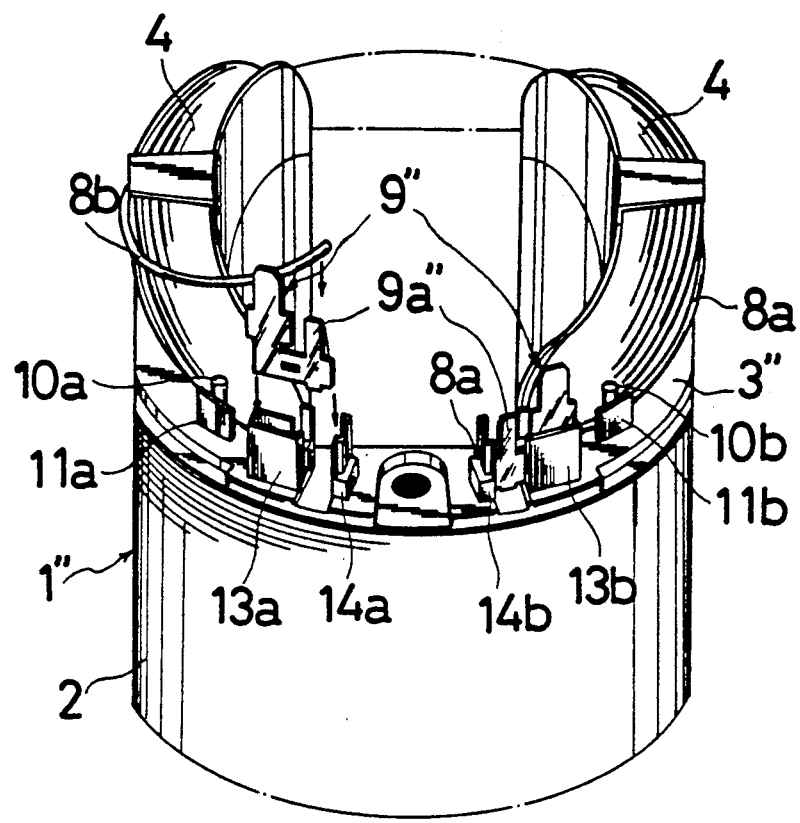
FIG. 3 is a partly omitted perspective view showing a field assembly according to a third embodiment of the invention.
Figure 4:
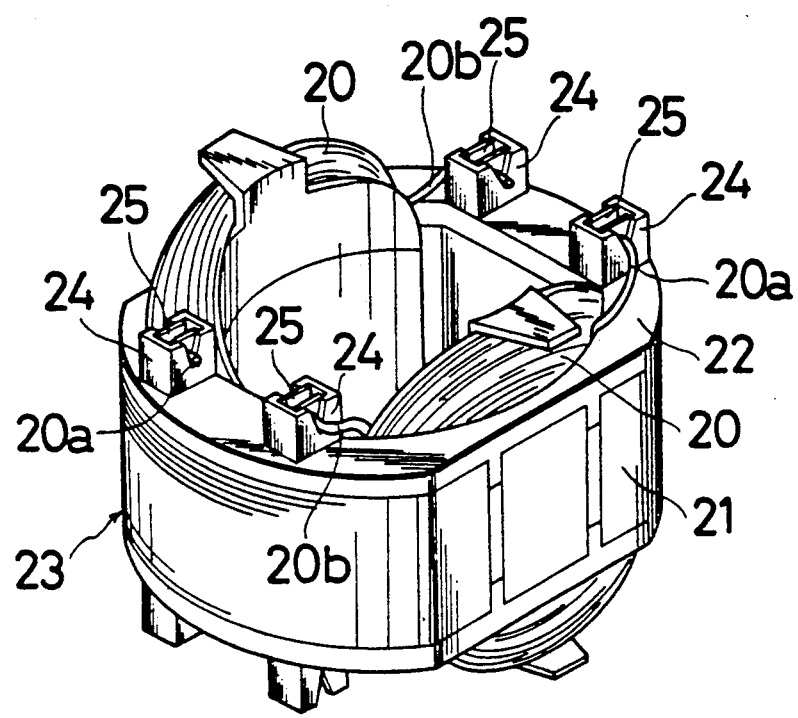
FIG. 4 is a perspective view showing a conventional structure of a field assembly as a prior art.

FIG. 3 is a partly omitted perspective view showing a field assembly 1'' according to a third embodiment of the invention. In the field assembly 1'' of the third embodiment, a first or starting end 8a and a second or terminal end 8b of a coil wire 8 are fixed to terminals 9'',9'' by welding, respectively. A terminal plate 3'' of the field assembly 1'' includes two pairs of first terminal supporting elements 13a, 14a formed in the vicinity of first or starting ends of coil windings 4, 4 and two pairs of second terminal supporting elements 13b, 14b formed in the vicinity of second or terminal ends of the coil windings 4, 4. Each terminal 9'' is inserted in and fixed between the first terminal supporting elements 13a and 14a or the second terminal supporting elements 13b and 14b. The terminal 9'' has a cut-away portion 9a'' in which the first end 8a or the second end 8b of the coil wire 8 is welded and fixed to ensure an electrical contact. The terminal plate 3'' of the third embodiment further includes four pairs of partition walls 10a, 11a, 10b, 11b.

The structure of the third embodiment allows both ends of the coil winding to be fixed to the terminal supporting elements without undesirable bending or curving, thus effectively preventing concentration of stress on a certain position of the coil wire in vibration or shock.

Since the invention may be embodied in other forms without departing from the scope or spirit of essential characteristics thereof, it is clearly understood that the above embodiment is only illustrative and not restrictive in any sense. The spirit and scope of the present invention is limited only by the terms of the appended claims.

What is claimed is:

1. A field assembly of an electric motor comprising a metallic core formed of a stack of annular laminations around a cavity and having an upper end and a lower end, and a terminal plate composed of an insulating material and mounted on said upper end of said core, said terminal plate further comprising a coil winding disposed on said core, said coil winding having first and second coil ends extending therefrom, a plurality of wings each retaining said coil winding, first terminal supporting means disposed in the vicinity of said first coil end of said coil winding for supporting and retaining said second coil end of said coil winding, and of second terminal supporting means disposed in the vicinity of said second coil end of said coil winding for supporting and retaining said first coil end of said coil winding, wherein said first coil end extending from said coil winding runs across and over said coil winding wound on said core to be received by said second terminal supporting means disposed in the vicinity of said second coil end of said coil winding, and said second coil end extending from said coil winding runs across and over said coil winding wound on said core to be received by said first terminal supporting means disposed in the vicinity of said first coil end of said coil winding.

2. A field assembly in accordance with claim 1, wherein each of said first and second terminal supporting means comprises a box-like terminal well having a pair of Y shaped slots for receiving and retaining one end of said coil wire, and a U shaped terminal with an opening being pressed and inserted into each said terminal well.

3. A field assembly in accordance with claim 1, wherein said terminal plate further comprises a slit disposed outside said coil winding for holding said coil wire wound outside said coil winding.

4. A field assembly in accordance with claim 1, wherein said terminal plate further comprises a plurality of partition wall means, each partition wall means being arranged between said first or second terminal supporting means and said coil winding to face said cavity of said coil winding.

5. A field assembly in accordance with claim 4, wherein said partition wall means comprises an inner guide wall element disposed between said coil winding and said first or second coil end extending from said coil winding to retain said first or second coil end of said coil winding from said coil winding, and an outer guide wall element spaced from said inner guide wall element to hold said first or second coil end of said coil winding between said inner guide wall element and said outer guide wall element.

6. A field assembly in accordance with claim 4, wherein said partition wall means comprises a larger guide wall element and a smaller guide wall element, said smaller guide wall element being disposed between said coil winding and said coil end extending therefrom to prevent contact between said coil end and said coil winding, said larger guide wall element being disposed outside of said smaller guide wall element to provide an insulating distance between said coil end and said coil winding.

7. In a field assembly of an electric motor having a metallic core formed of a stack of annular laminations around a cavity and having an upper end and a lower end, and a terminal plate of an insulating material and mounted on said upper end of said core, the improvement comprising a coil winding disposed on said core and having first and second coil ends extending therefrom, at least one first terminal supporting means on said terminal plate and disposed in the vicinity of said first coil end of said coil winding, said first terminal supporting means supporting and retaining said second coil end of said coil winding, and at least one second terminal supporting means on said terminal plate and disposed in the vicinity of said second coil end of said coil winding, said second terminal supporting means supporting and retaining said first coil end of said coil winding, whereby said coil winding is mounted with said ends thereof having an enhanced degree of freedom.

* * * * *